(12) United States Patent
Wu et al.

(10) Patent No.: US 9,455,794 B2
(45) Date of Patent: Sep. 27, 2016

(54) DEVICE REGISTRATION AND SOUNDING IN A TIME-DIVISION MULTIPLE ACCESS NETWORK

(71) Applicant: QUALCOMM INCORPORATED, San Diego, CA (US)

(72) Inventors: Haipeng Wu, Shanghai (CN); Patrick Tse, Toronto (CA); Xin Liang, Shanghai (CN); Lihong Sun, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 14/429,346

(22) PCT Filed: Oct. 29, 2012

(86) PCT No.: PCT/CN2012/083675
§ 371 (c)(1),
(2) Date: Mar. 18, 2015

(87) PCT Pub. No.: WO2014/067044
PCT Pub. Date: May 8, 2014

(65) Prior Publication Data
US 2015/0249515 A1    Sep. 3, 2015

(51) Int. Cl.
*H04J 3/16* (2006.01)
*H04L 12/28* (2006.01)
*H04L 29/06* (2006.01)
*H04W 60/00* (2009.01)
(Continued)

(52) U.S. Cl.
CPC ......... *H04J 3/1694* (2013.01); *H04L 12/2801* (2013.01); *H04L 12/2856* (2013.01); *H04L 12/4035* (2013.01); *H04L 63/08* (2013.01); *H04L 63/0876* (2013.01); *H04W 60/00* (2013.01); *H04W 84/18* (2013.01)

(58) Field of Classification Search
None
See application file for complete search history.

(56) References Cited

U.S. PATENT DOCUMENTS 5,528,605 A    6/1996    Ywoskus et al.
5,633,861 A    5/1997    Hanson et al.
(Continued)

FOREIGN PATENT DOCUMENTS

CN    1697348 A    11/2005
CN    1845520 A    10/2006
(Continued)

OTHER PUBLICATIONS

Supplementary European Search Report—EP12887757—Search Authority—Munich—Jun. 1, 2016.
(Continued)

*Primary Examiner* — Timothy J Weidner
(74) *Attorney, Agent, or Firm* — Paradice and Li LLP

(57) ABSTRACT

A master device transmits beacon messages to a plurality of slave devices. The beacon messages specify upstream time slots, downstream time slots, and contention-based time slots. To register a respective slave device with the master device, the respective slave device transmits an association request to the master device during a contention-based time slot and receives an association response from the master device during a first downstream time slot. In response to receiving the association response, the respective slave device transmits an authentication request to the master device during an upstream time slot and receives an authentication response from the master device during a second downstream time slot.

21 Claims, 7 Drawing Sheets

(51) Int. Cl.
*H04L 12/403* (2006.01)
*H04W 84/18* (2009.01)

(56) References Cited

U.S. PATENT DOCUMENTS

| | | |
|---|---|---|
| 6,324,184 B1 | 11/2001 | Hou et al. |
| 6,327,264 B1 | 12/2001 | Terry et al. |
| 6,434,165 B1 | 8/2002 | Sherer et al. |
| 6,650,624 B1 | 11/2003 | Quigley et al. |
| 6,834,057 B1 | 12/2004 | Rabenko et al. |
| 6,907,001 B1 | 6/2005 | Nakayama et al. |
| 6,944,148 B1 | 9/2005 | Gehring et al. |
| 6,947,998 B2 | 9/2005 | Mekkittikul et al. |
| 7,027,394 B2 | 4/2006 | Gupta et al. |
| 7,124,333 B2 | 10/2006 | Fukushima et al. |
| 7,277,389 B2 | 10/2007 | Bly et al. |
| 7,369,495 B1 | 5/2008 | Lemaire et al. |
| 7,742,495 B2 | 6/2010 | Kliger et al. |
| 7,848,330 B2 | 12/2010 | Nishibayashi et al. |
| 7,856,008 B2 | 12/2010 | Ayyagari et al. |
| 8,170,051 B2 | 5/2012 | Yonge, III et al. |
| 8,204,951 B2 | 6/2012 | Kornerup et al. |
| 8,228,797 B1 | 7/2012 | Utley et al. |
| 9,173,224 B2 * | 10/2015 | Cai .................. H04W 72/10 |
| 2002/0099838 A1 | 7/2002 | Sebastian |
| 2005/0169296 A1 | 8/2005 | Katar et al. |
| 2007/0014237 A1 | 1/2007 | Nishibayashi et al. |
| 2007/0195956 A1 | 8/2007 | Gavette |
| 2008/0165709 A1 | 7/2008 | Soliman |
| 2008/0279126 A1 | 11/2008 | Katar et al. |
| 2009/0129326 A1 | 5/2009 | Kim et al. |
| 2009/0154487 A1 | 6/2009 | Ryan et al. |
| 2009/0316670 A1 | 12/2009 | Grandham et al. |
| 2010/0054215 A1 | 3/2010 | Stahl et al. |
| 2011/0075641 A1 | 3/2011 | Siriwongpairat et al. |
| 2011/0188507 A1 | 8/2011 | Watts |
| 2011/0292795 A1 | 12/2011 | Johnson et al. |

FOREIGN PATENT DOCUMENTS

| | | |
|---|---|---|
| CN | 101087238 A | 12/2007 |
| CN | 101541084 A | 9/2009 |
| CN | 101873703 A | 10/2010 |
| CN | 101924706 A | 12/2010 |
| CN | 102123439 A | 7/2011 |
| EP | 0985275 A1 | 3/2000 |
| WO | WO-02097476 A2 | 12/2002 |
| WO | WO-2005008938 A2 | 1/2005 |
| WO | WO-2009115970 A1 | 9/2009 |

OTHER PUBLICATIONS

HomePlug Powerline Alliance. "HomePlug 1.0 Technology White Paper." http://www.homeplug.org/tech/whitepapers/HP_1.0_TechnicalWhitePaper_FINAL.pdf, 9 pgs.

HomePlug Powerline Alliance Inc., "HomePlug AV White Paper," Doc. Ver. No. HPAVWP-050818, Aug. 2005, pp. 1-11.

International Search Report and Written Opinion—PCT/CN2012/083675—ISA/EPO—Aug. 15, 2013.

Yonge, L., "HomePlug AV Technical Overview ISPLC 2006—Orlando", FL 1-22, Mar. 28, 2006.

* cited by examiner

DEVICE REGISTRATION AND SOUNDING IN A TIME-DIVISION MULTIPLE ACCESS NETWORK

TECHNICAL FIELD

The present embodiments relate generally to communication systems, and specifically to networks that use Time-Division Multiple Access (TDMA).

BACKGROUND OF RELATED ART

A system in which a master device is coupled to multiple slave devices may be implemented using a TDMA protocol, such that access to the medium coupling the devices is time-multiplexed among the devices. For example, the master device allocates bandwidth among the slave devices and assigns corresponding dedicated time slots to respective slave devices during which the respective slave devices may transmit. The TDMA protocol may allow for contention-based time slots, in which devices may compete for transmission bandwidth. Contention-based time slots, however, reduce the time available for dedicated time slots and thus may reduce transmission throughput and efficiency in the system.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Figure 1:
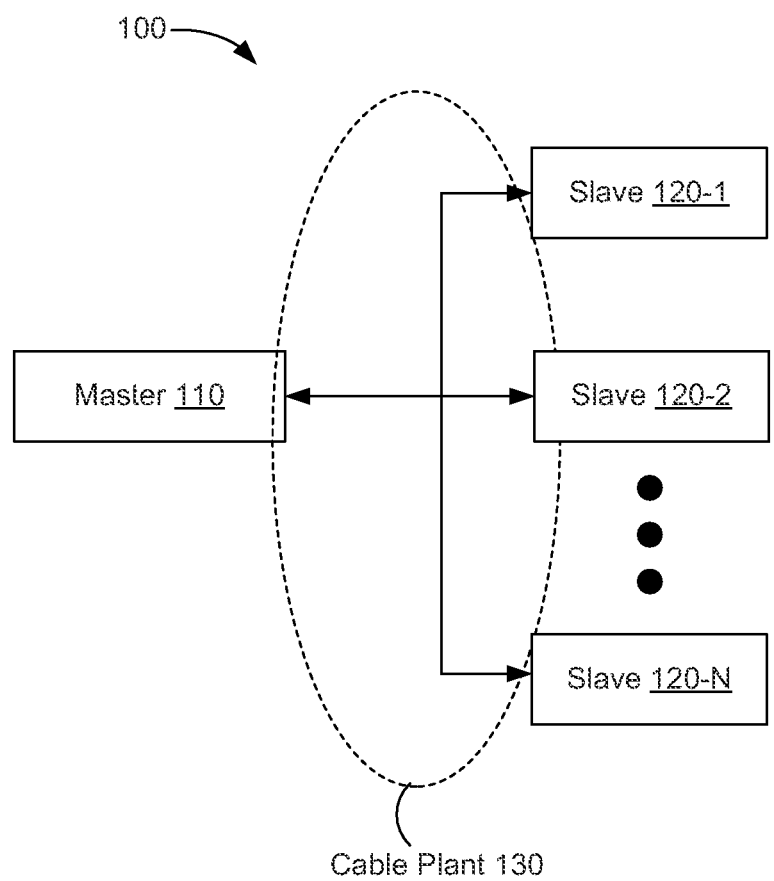
FIG. 1 is a block diagram of a system with coax links in accordance with some embodiments.

Embodiments are disclosed in which portions of a device registration process are performed using assigned upstream and/or downstream time slots, and in which sounding is performed in response to completion of the registration process.

In some embodiments, a method of registering a network device is performed in a respective slave device of a plurality of slave devices coupled to a master device. In the method, beacon messages are received from the master device. The beacon messages specify upstream time slots, downstream time slots, and contention-based time slots. During a contention-based time slot, an association request is transmitted to the master device. During a first downstream time slot, an association response is received from the master device. In response to receiving the association response, an authentication request is transmitted to the master device during an upstream time slot. An authentication response is received from the master device during a second downstream time slot.

In some embodiments, a slave device includes a physical-layer device (PHY) to transmit signals to and receive signals from a master device. The received signals include beacon messages specifying upstream time slots, downstream time slots, and contention-based time slots. The slave device also includes one or more processors and memory. The memory stores instructions that, when executed by the one or more processors, cause the slave device to transmit an association request to the master device during a contention-based time slot; process an association response received from the master device during a first downstream time slot; transmit an authentication request to the master device during an upstream time slot, in response to receiving the association response; and process an authentication response received from the master device during a second downstream time slot.

In some embodiments, a method of registering a network device is performed in a master device coupled to a plurality of slave devices. In the method, beacon messages are transmitted that specify upstream time slots, downstream time slots, and contention-based time slots. During a contention-based time slot, an association request is received from a respective slave device. In response to the association request, an association response is transmitted to the respective slave device during a first downstream time slot. An authentication request is received from the respective slave device during an upstream time slot. In response to the authentication request, an authentication response is transmitted to the respective slave device during a second downstream time slot.

In some embodiments, a master device includes a PHY to transmit signals to and receive signals from a plurality of slave devices. The master device also includes one or more processors and memory. The memory stores instructions that, when executed by the one or more processors, cause the master device to transmit beacon messages that specify upstream time slots, downstream time slots, and contention-based time slots; process an association request received from a respective slave device during a contention-based time slot; transmit an association response to the respective slave device during a first downstream time slot, in response to the association request; process an authentication request received from the respective slave device during an upstream time slot; and transmit an authentication response to the respective slave device during a second downstream time slot, in response to the authentication request.

In some embodiments, a system includes a master device coupled to a plurality of slave devices. The master device is configured to transmit beacon messages that specify upstream time slots, downstream time slots, and contention-based time slots; transmit an association response to the respective slave device during a first downstream time slot, in response to an association request from a respective slave device; and transmit an authentication response to the respective slave device during a second downstream time slot, in response to an authentication request from the respective slave device. The respective slave device is configured to transmit the association request during a contention-based time slot and transmit the authentication request during an upstream time slot.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1 illustrates a system (e.g., an access network) 100 in which a master device 110 is coupled to multiple slave devices 120-1 through 120-N, where N is an integer greater than one, in accordance with some embodiments. In some embodiments, the master device 110 is coupled to the slave devices 120-1 through 120-N using coaxial cable ("coax") links that compose a cable plant 130. For example, the system 100 may be an Ethernet over Coax (EoC) access network. In some embodiments, the system 100 may be implemented in accordance with the HomePlug AV/IEEE1901 standard (e.g., as adapted for use with a coax medium). Transmissions from the master device 110 to the slave devices 120-1 through 120-N are referred to as downstream traffic and transmissions from respective slave devices 120-1 through 120-N to the master device 110 are referred to as upstream traffic.

Access to the medium (e.g., the coax links of the cable plant 130) that couples that devices 110 and 120-1 through 120-N is time-multiplexed using a Time-Division Multiple Access (TDMA) protocol. In some embodiments, the master device 110 periodically broadcasts a medium access schedule (also referred to as a channel access schedule) to all slave devices 120-1 through 120-N. For example, the channel access schedule is periodically broadcast in a message called a beacon message or simply a beacon. The channel access schedule assigns dedicated time slots to respective slave devices 120, such that a respective slave device 120 may transmit during its dedicated time slot and not during time slots assigned to other slave devices 120. A scheduler in the master device 110 determines the amount of medium access for each slave device 120, based for example on the service level agreements (SLAs) between end users associated with respective slave devices 120 and the service provider (e.g., cable operator) who controls the master device 110. The scheduler constructs the channel access schedule based on the determined amounts of medium access for the slave devices 120. The channel access schedule may also include a contention-based time slot during which multiple slave devices 120 may compete to transmit in accordance with a carrier-sense multiple access (CSMA) protocol.

Figure 2:
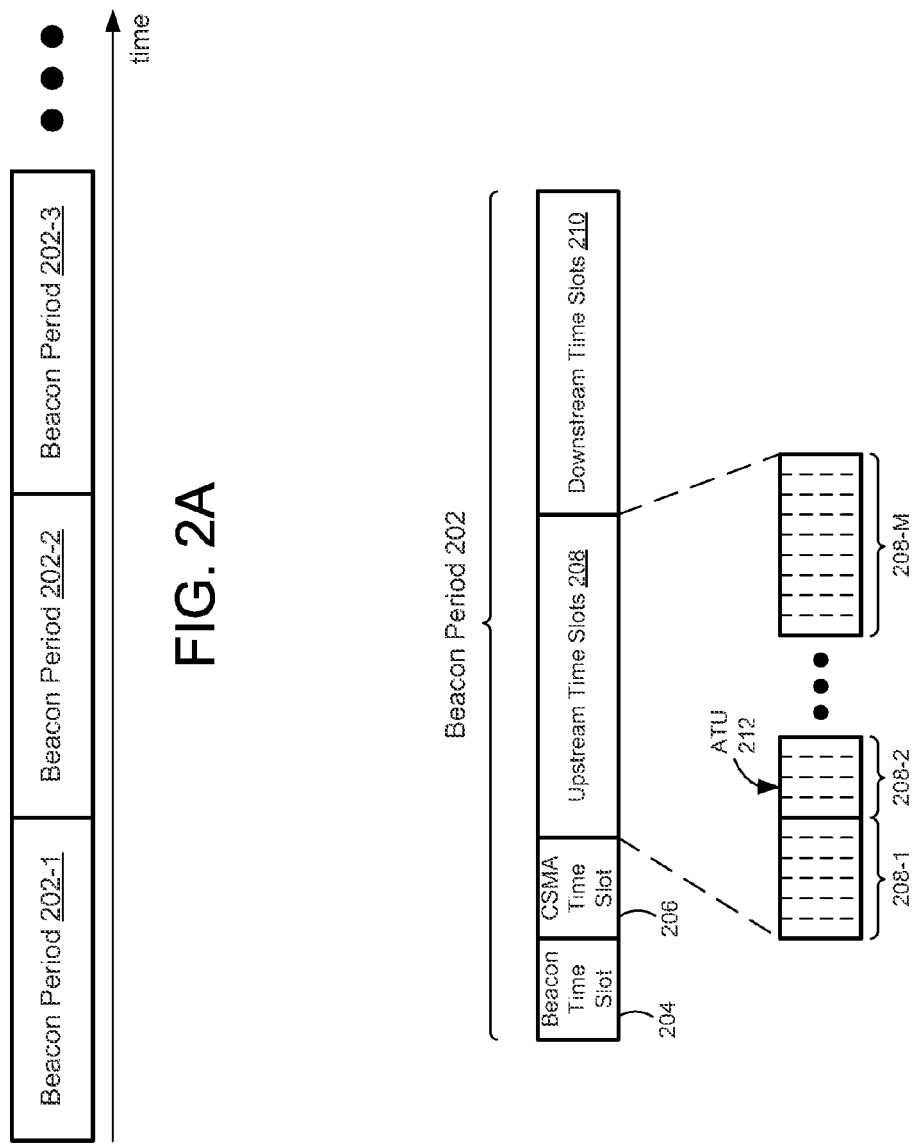
FIG. 2A illustrates a sequence of beacon periods in accordance with some embodiments.
FIG. 2B illustrates time slots in a beacon period in accordance with some embodiments.

The period between broadcasts of successive channel access schedules (e.g., the period from the beginning of a beacon message to the beginning of the next beacon message) is called a beacon period. FIG. 2A illustrates a sequence of beacon periods in accordance with some embodiments: a first beacon period 202-1 is followed by a second beacon period 202-2, which is followed in turn by a third beacon period 202-3. Each beacon period 202 is divided into different time slots, as shown in FIG. 2B in accordance with some embodiments. A first time slot 204 is allocated for transmission of the beacon message and thus for transmission of the channel access schedule. A second time slot 206 is a contention-based time slot in which the slave devices 120-1 through 120-N may compete for transmission bandwidth in accordance with a carrier-sense multiple access (CSMA) protocol. For example, newly activated slave devices 120 may compete to use the contention-based time slot 206 to begin registering with the master device 110. A respective newly activated slave device 120 listens to the channel (e.g., the coax cable plant 130, FIG. 1) during the contention-based time slot 206 and, if it determines that the channel is idle, transmits a message (e.g., an association request) to the master device 110 to initiate registration. If the respective newly activated slave device 120 detects that the channel is not idle (e.g., another device is transmitting), it does not transmit the message; instead, it tries again later during the same contention-based time slot 206 or during a subsequent contention-based time slot 206. In some embodiments, the contention-based time slot 206 is not included in every beacon period 202, but instead is only included in a portion of the beacon periods 202. In some embodiments, the contention-based time slot 206 has a duration on the order of milliseconds (e.g., in the range of 1-5 ms).

Each beacon period 202 further includes upstream time slots 208 and downstream time slots 210. The time slots 208 and 210 are allocated in accordance with a time-division multiple access (TDMA) protocol. Respective upstream time slots 208 are assigned to respective slave devices 120 for upstream transmissions to the master device 110. These assignments are based at least in part on the reported status of transmission queues in the slave devices 120. For example, a slave device 120 may have multiple queues (e.g., a control packet queue 320 and one or more data packets queues 322, FIG. 3), each of which buffers upstream traffic (e.g., control packets and data packets). When an upstream time slot 208 is assigned to a specific slave device 120, traffic buffered in one or more queues of that slave device 120 may be transmitted upstream to the master device 110 during the upstream time slot 208. A first upstream time slot 208-1 thus may be assigned to a first slave device 120-1, a second upstream time slot 208-2 may be assigned to a second slave device 120-2, and so on. A slave device 120 may use an assigned upstream time slot 208 to transmit traffic from multiple queues. For example, each queue may store data blocks. Data blocks from multiple queues may be combined into a single data unit that is transmitted during an upstream time slot 208. In some embodiments, the data blocks are fixed-length blocks. For example, the data blocks are fixed-length physical layer blocks (PHY blocks, referred to as PBs) of 512 bytes each (e.g., as defined in the HomePlug AV/IEEE1901 standard) and the data unit is a media access controller (MAC) protocol data unit (MPDU) (e.g., as defined in the HomePlug AV/IEEE1901 standard).

A total of M upstream time slots 208 are assigned to M slave devices 120, where M is the number of slave devices 120 allowed to transmit during a respective beacon period 202. The number M may vary from beacon period 202 to beacon period 202, depending for example on the available bandwidth and demand for bandwidth during different beacon periods 202.

Downstream time slots 210 are allocated for downstream transmissions by the master device 110. The downstream time slots 210 may include time slots for unicast transmissions to specific slave devices 120 as well as a time slot for broadcasts to all of the slave devices 120-1 through 120-N. Because the downstream time slots 210 are allocated to the master device 110, the slave devices 120 do not transmit during the downstream time slots 210. The master device 110 may have multiple queues (e.g., a control packet queue 308 and one or more data packet queues 310, FIG. 3), each of which buffers downstream traffic (e.g., control packets and data packets). The master device 110 may use a downstream time slot 210 to transmit traffic from multiple queues, in the same manner described for upstream transmissions by slave devices 120.

In some embodiments, the lengths (i.e., durations) of the time slots 204, 206, 208, and/or 210 are variable, as shown for the time slots 208-1, 208-2, and 208-M in FIG. 2B. For example, the scheduler in the master device 110 assigns time slots of different lengths to different slave devices 120, in accordance with a dynamic bandwidth allocation (DBA) algorithm. The time slots 204, 206, 208, and 210 are divided into fixed-length allocation time units (ATUs) 212, such that each time slot is an integer number of ATUs 212. An ATU 212 is thus the unit of time for specifying the length of a time slot. In some embodiments (e.g., in accordance with the HomePlug AV/IEEE 1901 standard), an ATU 212 is 10.24 us. The beacon message specifies the length of each time slot by specifying the number of ATUs 212 assigned to each time slot. For example, each slave device 120 is assigned an identifier (sometimes referred to as a terminal equipment identifier or TEI). Respective fields in the beacon message are associated with respective identifiers and contain bits specifying the number of ATUs 212 for respective time slots assigned to the slave devices 120 corresponding to respective identifiers. The bits specifying the number of ATUs 212 for a respective time slot may be spread over more than one field in the beacon message (e.g., may be divided between two fields). Also, a respective field may include a first set of bits for a first time slot and a second set of bits for a second time slot.

In each beacon period 202 (e.g., during respective upstream time slots 208), the slave devices 120-1 through 120-N report their amounts of queued upstream traffic to the master device 110 so that the master device 110 can create an appropriate channel access schedule for a subsequent (e.g., the next) beacon period 202. The amount of queued upstream traffic for a respective slave device 120 may include the amount of control-packet traffic and data-packet traffic. The channel access schedule for the subsequent (e.g., next) beacon period 202 assigns upstream time slots 208 based on the reported amounts of queued upstream traffic. (The channel access schedule may also reflect the levels of service provided for in the service level agreements.) Similarly, the channel access schedule assigns downstream time slots 210 based on the amounts of queued downstream traffic (e.g., control-packet traffic and data-packet traffic) in the master device 110.

Figure 3:
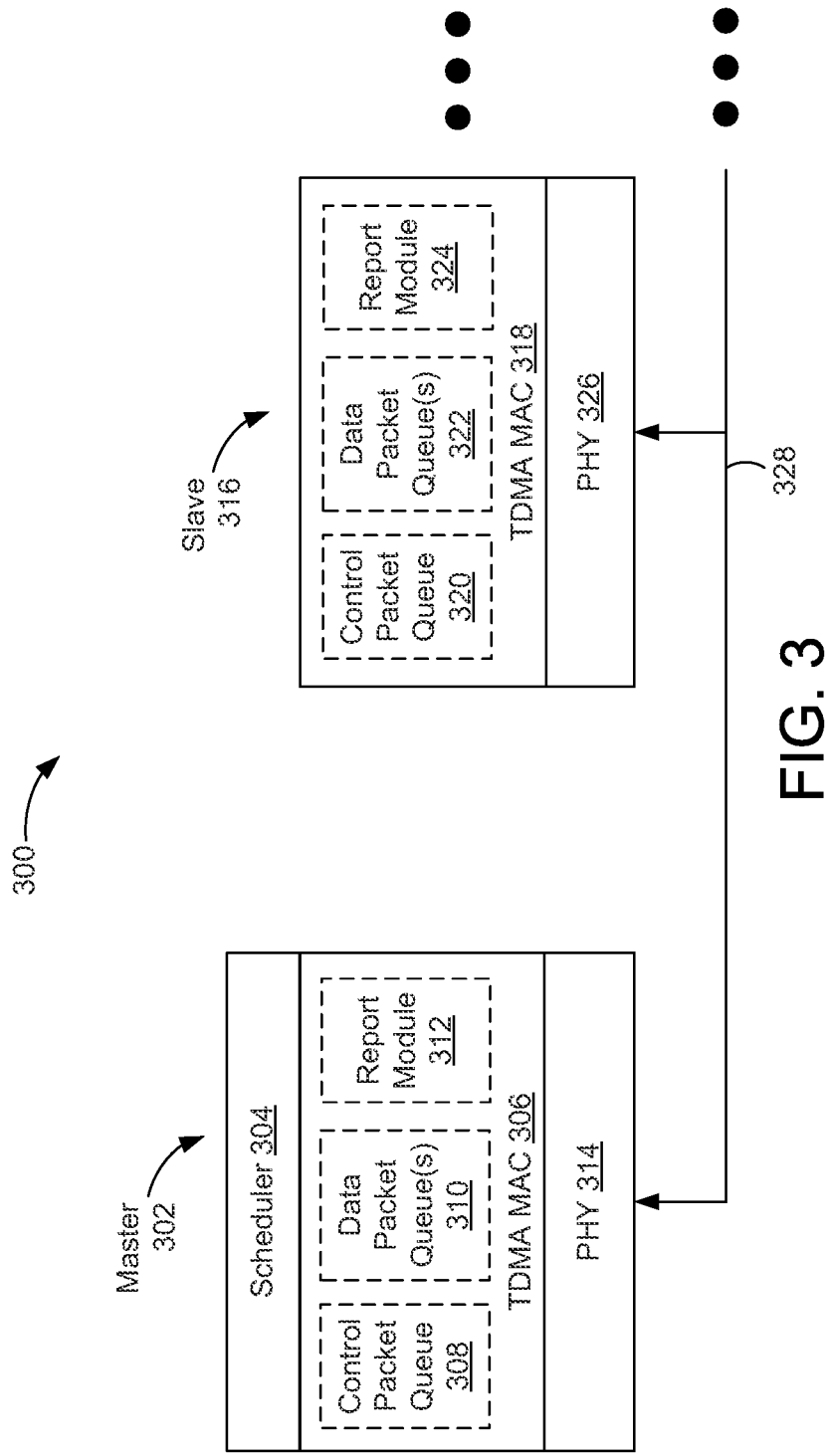
FIG. 3 is a block diagram of a master device coupled to a plurality of slave devices in accordance with some embodiments.

FIG. 3 illustrates a system 300 that is an example of the system 100 (FIG. 1) in accordance with some embodiments. A master device 302 (e.g., master device 110, FIG. 1) is coupled to slave devices 316 (e.g., slave devices 120, FIG. 1) by coax links 328 (e.g., in the cable plant 130, FIG. 1). The master device 302 includes a physical layer device (PHY) 314 (e.g., a HomePlug AV PHY) to transmit and receive signals (e.g., orthogonal frequency-division multiplexing (OFDM) signals) over the coax links 328. The master device 302 also includes a TDMA media access controller (MAC) 306 coupled to the PHY 314, and a scheduler 304 coupled to the TDMA MAC 306. In some embodiments, the scheduler 304 is a DBA scheduler. Alternatively, the scheduler 304 performs static bandwidth allocation (SBA) and is referred to as an SBA scheduler. The slave device 316 includes a PHY 326 (e.g., a HomePlug AV PHY) to transmit and receive signals (e.g., OFDM signals) over the coax links 328. The slave device 316 also includes a TDMA MAC 318 coupled to the PHY 326.

The TDMA MAC 318 of the slave device 316 includes a control packet queue 320 to store control packets for subsequent upstream transmission to the master device 302 and one or more data packet queues 322 to store data packets for subsequent upstream transmission to the master device 302. In some embodiments, the control packets buffered in the queue 320 are management message entries (MMEs) (e.g., in accordance with the HomePlug AV/IEEE1901 standard.) The control packets may include association requests and authentication requests used to register the slave device 316 with the master device 302, sounding requests, and/or queue status reports. In some embodiments, the one or more data packet queues 322 include a low-priority queue to buffer low-priority traffic and a high-priority queue to buffer high-priority traffic, and may also include a retransmission queue to buffer traffic that was not properly received by the master device 302 and therefore is to be retransmitted. (The terms low-priority and high-priority as used herein are used with respect to each other: low-priority traffic has lower priority than high-priority traffic, and vice versa). The TDMA MAC 318 further includes a report module 324 that monitors the status (e.g., the lengths, and thus the amount of queued traffic) of the queues 320 and 322 and prepares queue status reports for transmission to the master device 302. The slave device 316 transmits these reports to the master device 302 during upstream time slots 208 (FIG. 2B). The report module 324 also prepares acknowledgments that report whether transmissions from the master device 302 were correctly received. Whether a transmission has been correctly received is determined, for example, based on a checksum.

The TDMA MAC 306 of the master device 302 includes a control packet queue 308 to store control packets for subsequent downstream transmission to slave devices 316 and one or more data packet queues 310 to store data packets for subsequent downstream transmission to slave devices 316. In some embodiments, the control packets buffered in the queue 308 are management message entries (MMEs) (e.g., in accordance with the HomePlug AV/IEEE1901 standard.) The control packets may include association responses and authentication responses used to register a respective slave device 316 (e.g., a newly activated slave device 316) with the master device 302. In some embodiments, the one or more data packet queues 310 include a low-priority queue to buffer low-priority traffic and a high-priority queue to buffer high-priority traffic, and may also include a retransmission queue to buffer traffic that was not properly received by slave devices 316 and therefore is to be retransmitted. The TDMA MAC 306 also includes a report module 312 to prepare acknowledgments that report whether transmissions from respective slave devices 316 were correctly received.

Figure 4:
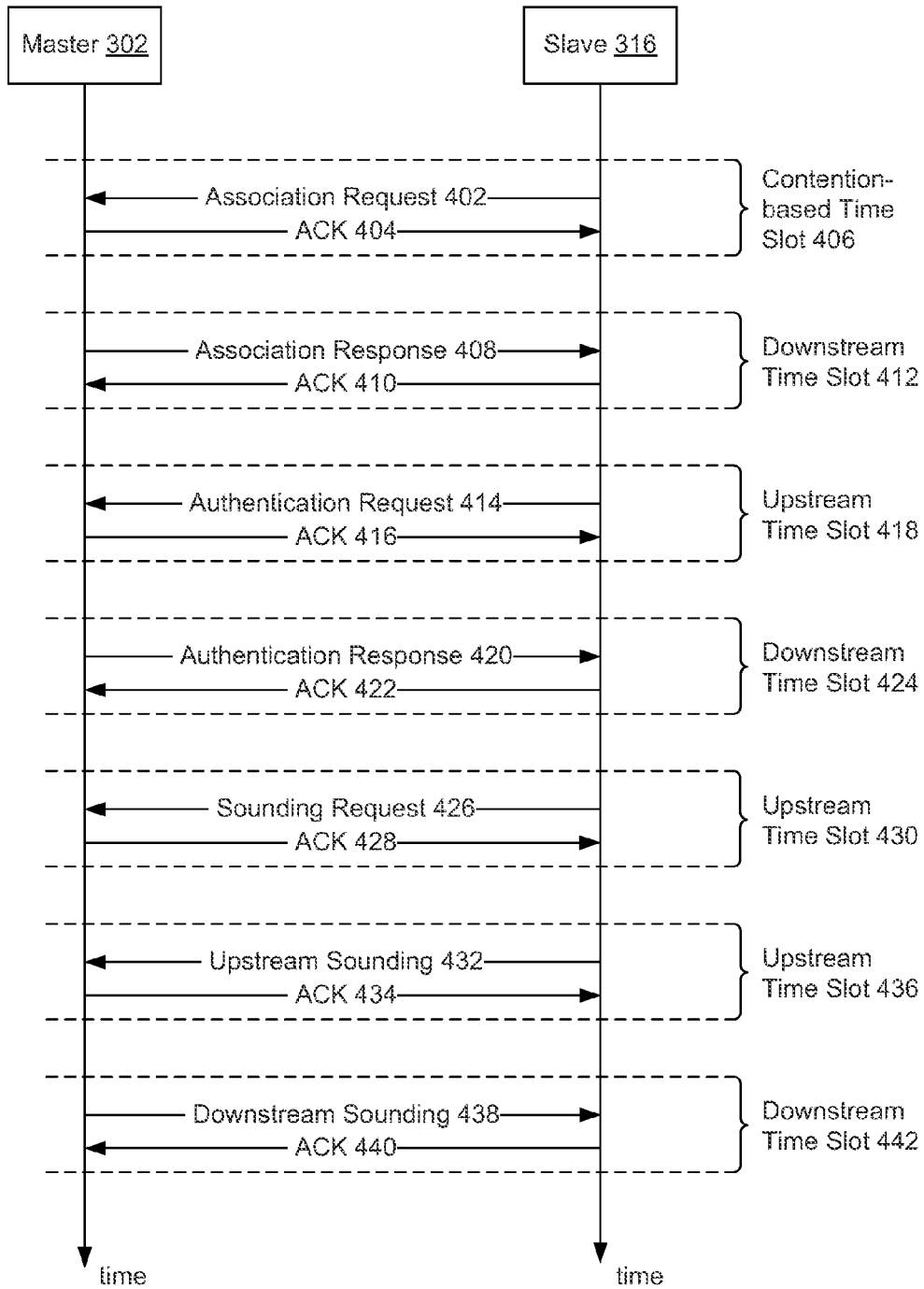
FIG. 4 is a time line illustrating a registration and sounding process for a slave device coupled to a master device in accordance with some embodiments.

FIG. 4 is a time line illustrating a registration and sounding process for a slave device 316 coupled to the master device 302 (FIG. 3) in accordance with some embodiments. When the slave device 316 is activated, it registers with the master device 302 in a process that involves association and authentication. Once the slave device 316 has been associated with the master device 302 and has been authenticated, it may exchange data packets with the master device 302. In some embodiments, however, sounding is performed upon completion of registration. Sounding involves the exchange of known data between the master device 302 and the slave device 316 to estimate channel characteristics and determine a tone map that specifies the modulation and coding schemes for different carrier frequencies.

In the time line of FIG. 4, the newly activated slave device 316 transmits an association request 402 to the master device 302 during a contention-based time slot 406, which is an example of a contention-based time slot 206 (FIG. 2B). In some embodiments, the master device 302 responds with an acknowledgement (ACK) 404 during the time slot 406. The slave device 316 expects to receive the ACK 404 within a specified period of time (e.g., 80 us) after transmission of the association request 402. If the slave device 316 does not receive the ACK 404 within the specified period of time, it assumes the association request 402 was not correctly received and attempts to retransmit the association request 402. It may retransmit the association request 402 during the contention-based time slot 406 (e.g., if enough time remains during the time slot 406 and the channel is idle) or during a subsequent contention-based time-slot 206 in a later beacon period 202 (FIG. 2B).

Assuming the master device 302 receives the association request 402 correctly, it sends an association response 408 to the slave device 316 during a downstream time slot 412. The association response 408 assigns an identifier (e.g., a TEI) to the slave device 316. (The association response 408 is addressed to the MAC address of the slave device 316, as contained in a source address field in the association request 402. The MAC address is a unique identifier built into the slave device 316; the identifier in the association response 408 is a separate identifier that potentially may be assigned to any slave device 316 in the system 300, FIG. 3.) The identifier assigned by the association response 408 will be used in channel access schedules to assign upstream time slots 208 (FIG. 2B) to the slave device 316. The slave device 316 acknowledges the association response 408 with an ACK 410 during the downstream time slot 412. The slave device 316 is now associated with the master device 302.

The slave device 316 next transmits an authentication request 414 to the master device 302 during an upstream time slot 418. The master device 302 acknowledges the authentication request 414 with an ACK 416 during the upstream time slot 418, and responds with an authentication response 420 during a subsequent downstream time slot 424. The authentication response 420 provides a network security key to the slave device 316 for use during subsequent transmissions, thereby permitting secure transmissions between the master device 302 and slave device 316. The slave device 316 acknowledges the authentication response 420 with an ACK 422 during the downstream time slot 424. Authentication of the slave device 316 is now complete.

In response to the completion of authentication, the slave device 316 sends a sounding request 426 to the master device 302 that requests an allocation of bandwidth for performing sounding. The sounding request 426 is sent during an upstream time slot 430 and acknowledged with an ACK 428. Based on the request, the scheduler 304 (FIG. 3) in the master device 302 allocates an upstream time slot 436 for upstream sounding 432 and a downstream time slot 442 for downstream sounding 438. (The identifier assigned to the slave device 316 in the association response 408 is used in a channel access schedule to assign the upstream time slot 436 to the slave device 316.) While upstream sounding 432 is shown before downstream sounding 438 in FIG. 4, this order (and thus the order of time slots 436 and 442) may be reversed.

For upstream sounding 432, the slave device 316 sends known data to the master device 302 during the upstream time slot 436. An ACK 434 from the master device 302 acknowledges the transmission. The master device 302 compares the received data to the expected known data and estimates channel characteristics accordingly. Based on the estimated channel characteristics, respective modulation and coding schemes (MCSs) are selected for respective carrier frequencies and specified in a tone map for upstream communications from the slave device 316 to the master device 302.

For downstream sounding 438, the master device 302 sends known data to the slave device 316 during the downstream time slot 442. An ACK 440 from the slave device 316 acknowledges the transmission. The downstream sounding 438 is used to determine a tone map for downstream communications from the master device 302 to the slave device 316, in the manner described for the upstream tone map. Alternately, a single tone map is established and used for communications in both directions.

The downstream time slots 412, 424, and 442 are examples of downstream time slots 210 (FIG. 2B). The upstream time slots 418, 430, and 436 are examples of upstream time slots 208 (FIG. 2B). While the ACKs 404, 410, 416, 422, 428, 434, and 440 are shown as being transmitted in the same time slots as the messages they acknowledge, one or more (e.g., all) of the ACKs 404, 410, 416, 422, 428, 434, and 440 may instead be transmitted during a subsequent time slot. For example, the ACKs 404, 416, 428, and/or 434 may be transmitted in subsequent downstream time slots 210 (FIG. 2B), and the ACKs 410, 422, and/or 440 may be transmitted in subsequent upstream time slots 208 (FIG. 2B).

In some embodiments, the time slots 406, 412, 418, 424, 430, 436, and/or 442 are situated in successive beacon periods 202 (FIG. 4). In some embodiments, the upstream time slot 436 and/or downstream time slot 442 are situated in a next available beacon period 202 following the beacon period 202 containing the upstream time slot 430 in which the sounding request 426 is sent. For example, upstream sounding 432 and/or downstream sounding 438 are performed in the next beacon period following the sounding request 426, if bandwidth is available. If bandwidth is not available (e.g., because the number of devices requested sounding exceeds the number that the scheduler 304 can accommodate), then upstream sounding 432 and/or downstream sounding 438 are performed in a later beacon period 202 with sufficient bandwidth.

Flowcharts are now presented in which examples of registration and sounding are described first from the perspective of the slave device 316 and then from the perspective of the master device 302.

Figure 5A:
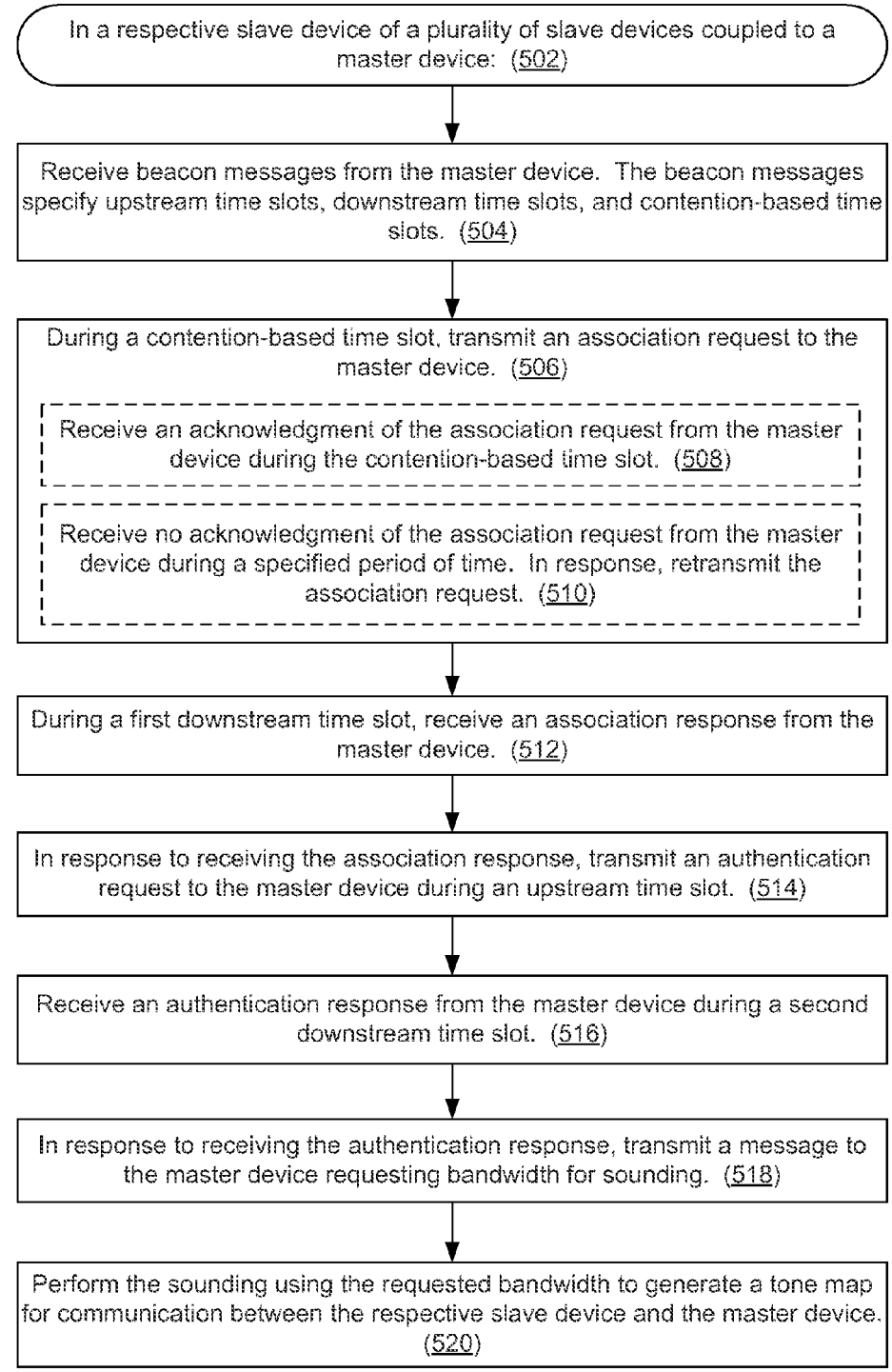
FIGS. 5A and 5B are flowcharts illustrating a method of registering a network device in accordance with some embodiments.

FIG. 5A is a flowchart illustrating a method 500 of registering a network device in accordance with some embodiments. The method 500 is performed (502) by a slave device 316, as coupled to the master device 302 and other slave devices 316 in the system 300 (FIG. 3).

In the method 500, beacon messages are received (504) from the master device 302. The beacon messages are received during beacon time slots 204 and include channel access schedules that specify upstream time slots 208, downstream time slots 210, and contention-based time slots 206 (FIG. 2B).

During a contention-based time slot 206 (e.g., time slot 406, FIG. 4), an association request (e.g., association request 402, FIG. 4) is transmitted (506) to the master device 302. The association request is transmitted in accordance with a CSMA protocol.

In some embodiments, an acknowledgment (e.g., ACK 404, FIG. 4) of the association request is received (508) from the master device 302 during the contention-based time slot 206. In some other embodiments, no acknowledgment of the association request is received (510) from the master device 302 during a specified period of time after transmitting (506) the association request. In response, the association request is retransmitted (e.g., during the same contention-based time slot 206 or a subsequent contention-based time slot 206).

An association response (e.g., association response 408, FIG. 4) is received (512) from the master device 302 during a first downstream time slot 210 (e.g., time slot 412, FIG. 4). The association response assigns an identifier (e.g., a TEI) to the slave device 316. The slave device 316 processes the association response to extract and store the identifier.

In response to receiving the association response, an authentication request (e.g., authentication request 414, FIG. 4) is transmitted (514) to the master device 302 during an upstream time slot 208 (e.g., time slot 418, FIG. 4).

An authentication response (e.g., authentication response 420, FIG. 4) is received (516) from the master device 302 during a second downstream time slot 210 (e.g., time slot 424, FIG. 4). The authentication response provides a security key to the slave device 316. The slave device 316 processes the authentication response to extract and store the security key.

In response to receiving the authentication response, a message (e.g., sounding request 426 as transmitted during upstream time slot 426, FIG. 4) is transmitted (518) to the master device 302 requesting bandwidth for sounding. One or more subsequent beacon messages include time slots allocated for the sounding, based on the request.

The sounding is performed (520) using the requested bandwidth. Performing the sounding may include transmitting known data (e.g., in the upstream sounding message 432, FIG. 4) to the master device 302 during an upstream time slot 208 (e.g., time slot 436, FIG. 4). Performing the sounding may further (or alternatively) include receiving known data (e.g., in the downstream sounding message 438, FIG. 4) from the master device 302 during a downstream time slot 210 (e.g., time slot 442, FIG. 4). Performing the sounding results in generation of one or more tone maps (e.g., an upstream tone map and a downstream tone map) to be used for subsequent communications between the slave device 316 and master device 302.

Figure 5B:
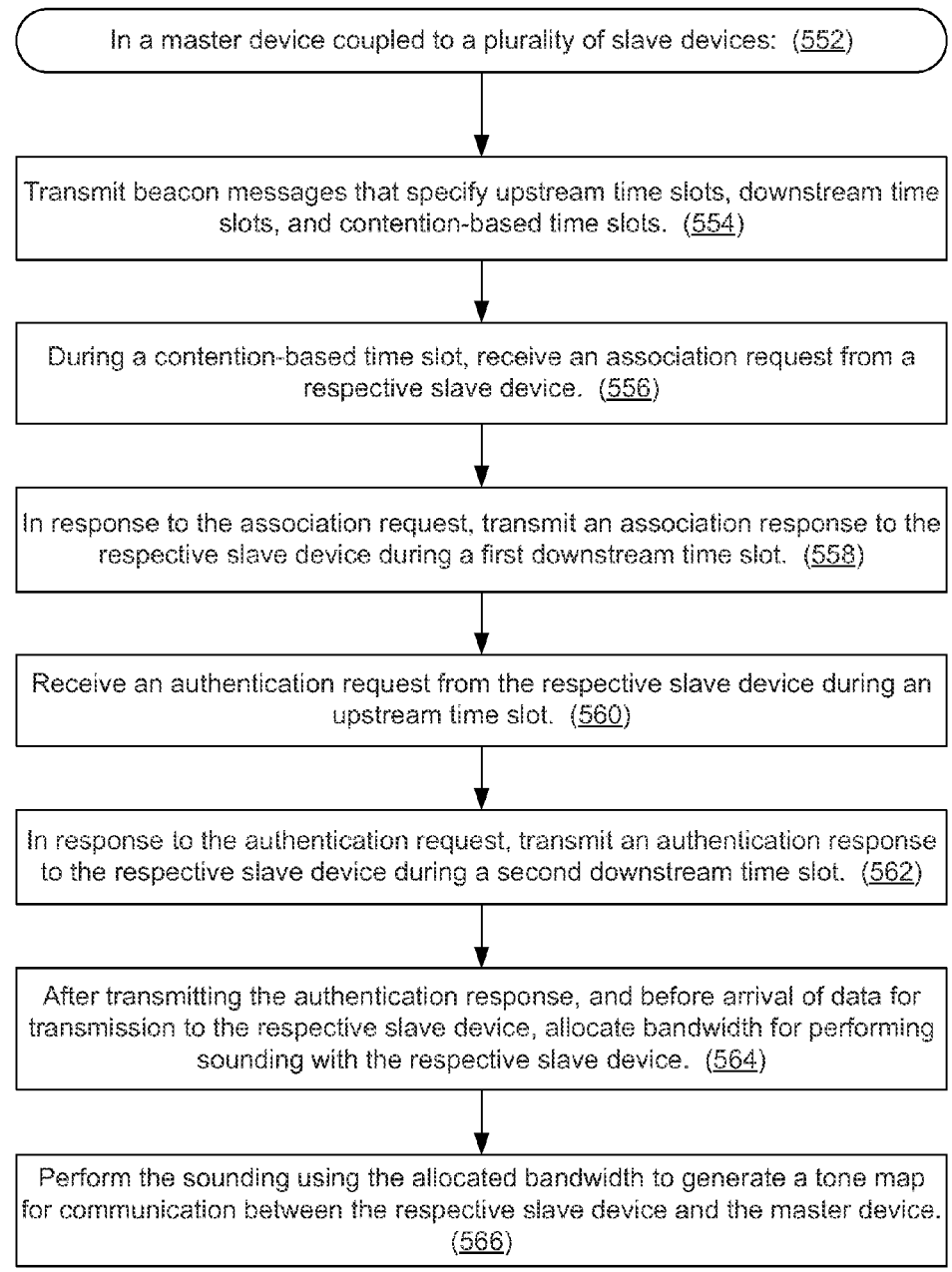

FIG. 5B is a flowchart illustrating a method 550 of registering a network device in accordance with some embodiments. The method 550 is performed (552) by a master device 302 coupled to a plurality of slave devices 316 in the system 300 (FIG. 3). The method 550 corresponds to the method 500 (FIG. 5A), such that the master device 302 performs the method 550 while a slave device 316 performs the method 500.

Beacon messages that specify upstream time slots 208, downstream time slots 210, and contention-based time slots 206 are transmitted (e.g., broadcasted) (554). The operation 554 corresponds to the operation 504 (FIG. 5A).

During a contention-based time slot 206 (e.g., time slot 406, FIG. 4), an association request (e.g., association request 402, FIG. 4) is received (556) from the respective slave device 316. The operation 556 corresponds to the operation 506 (FIG. 5A). The master device 302 processes the association request and selects an identifier (e.g., a next available identifier in a series) for the respective slave device 316.

In response to the association request, an association response (e.g., association response 408, FIG. 4) is transmitted (558) to the respective slave device 316 during a first downstream time slot 210 (e.g., time slot 412, FIG. 4). The association response specifies the identifier. The operation 558 corresponds to the operation 512 (FIG. 5A).

An authentication request (e.g., authentication request 414, FIG. 4) is received (560) from the respective slave device 316 during an upstream time slot 208 (e.g., time slot 418, FIG. 4). The operation 560 corresponds to the operation 514 (FIG. 5A). The master device 302 processes the authentication request and identifies a network security key for the respective slave device 316.

In response to the authentication request, an authentication response (e.g., authentication response 420, FIG. 4) is transmitted (562) to the respective slave device 316 during a second downstream time slot 210 (e.g., time slot 424, FIG. 4). The authentication response includes the network security key. The operation 562 corresponds to the operation 516 (FIG. 5A).

After transmitting the authentication response, and before arrival of data for transmission to the respective slave device 316, bandwidth is allocated (564) for performing sounding with the respective slave device 316. For example, the scheduler 304 (FIG. 3) allocates this bandwidth in response to a sounding request 426 (FIG. 4) from the respective slave device 316, as transmitted in the operation 518 (FIG. 5A).

The sounding is performed (566) using the allocated bandwidth to generate one or more tone maps for communication between the respective slave device 316 and the master device 302. Performing the sounding may include receiving known data (e.g., in the upstream sounding message 432, FIG. 4) from the respective slave device 316 during an upstream time slot 208 (e.g., time slot 436, FIG. 4). Performing the sounding may further (or alternatively) include transmitting known data (e.g., in the downstream sounding message 438, FIG. 4) to the respective slave device 316 during a downstream time slot 210 (e.g., time slot 442, FIG. 4). The operation 566 corresponds to the operation 520 (FIG. 5A).

Sounding uses a predefined amount of bandwidth. For example, the upstream sounding 432 and/or downstream sounding 438 (FIG. 4) may each include transmission of an MPDU with a predefined duration (e.g., of approximately 1.4 ms). In some embodiments, to accommodate this predefined amount of sounding bandwidth, the scheduler 304 in the master device 302 (FIG. 3) includes a configurable setting for a maximum number of sounding devices, which is the maximum number of devices that can perform sounding in a beacon period 202 (FIGS. 2A-2B). The maximum number of sounding devices is thus the maximum number of devices to which a channel access schedule can assign time slots for sounding. If the number of devices submitting sounding requests 426 (FIG. 4) during a beacon period 202 is less than or equal to the maximum number of sounding devices, the devices requesting sounding are all assigned timeslots for sounding. If the number of devices submitting sounding requests 426 (FIG. 4) during a beacon period 202 exceeds the maximum number of sounding devices, a number of devices equal to the maximum is assigned time slots for sounding. The remaining devices may request sounding again (e.g., by retransmitting sounding requests 426, FIG. 4)

during a subsequent (e.g., the next) beacon period 202. This process continues until sounding bandwidth has been allocated for all requesting devices. Because the setting for the maximum number of sounding devices is configurable, the system operator may strike a desired balance between latency for fulfilling sounding requests and data throughput.

While the methods 500 and 550 include a number of operations that appear to occur in a specific order, it should be apparent that the methods 500 and 550 can include more or fewer operations, which can be executed serially or in parallel. An order of two or more operations may be changed and two or more operations may be combined into a single operation. For example, the operations 504 (FIG. 5A) and 554 (FIG. 5B) are performed in an on-going manner during multiple beacon periods 202 (FIGS. 2A-2B).

The methods 500 and 550 allow the duration of contention-based time slots 206 (FIG. 2B) to be reduced or minimized by communicating the association response 408, authentication request 414, authentication response 420, and/or sounding request 426 (FIG. 4) during upstream time slots 208 and/or downstream time slots 210 (FIG. 2B). The contention-based time slots 206 thus may have short durations that do not accommodate these requests and responses, thereby increasing the time available for upstream and downstream time slots 208 and 210. In addition, in some embodiments the contention-based time slots 206 have configurable durations. Decreasing their duration increases bandwidth utilization and data throughput, while increasing their duration reduces collisions and registration latency. The system operator (e.g., cable operator) may tune the duration accordingly.

The methods 500 and 550 also may include an acknowledgment mechanism (e.g., as illustrated in FIG. 4), which improves the responsiveness of the registration process and reduces registration latency.

Furthermore, by performing sounding in response to completion of registration and before the arrival of data packets for transmission between the master device 302 and a newly registered slave device 316, the methods 500 and 550 allow the system operator (e.g., cable operator) to identify problems with channel conditions and begin debugging promptly.

Figure 6A:
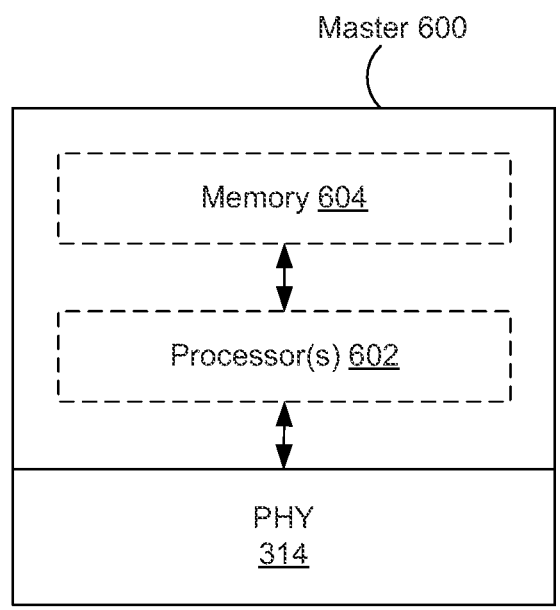
FIG. 6A is a block diagram of a master device in accordance with some embodiments.

In some embodiments, the TDMA MAC 306 and/or scheduler 304 (FIG. 3) in a master device 302 (FIG. 3) are implemented in software. FIG. 6A is a block diagram of a master device 600 that is an example of such a master device 302 in accordance with some embodiments. In the master device 600, the PHY 314 is coupled to one or more processor cores 602, which are coupled to memory 604. In some embodiments, the memory 604 includes a non-transitory computer-readable medium (e.g., one or more nonvolatile memory elements, such as EPROM, EEPROM, Flash memory, a hard disk drive, and so on) that stores instructions for execution by the one or more processor cores 602. The instructions include instructions that, when executed by the processor core(s) 602, cause the master device 600 to perform all or a portion of the method 550 (FIG. 5B). The memory 604 may also store slave device identifiers (e.g., TEIs), network security keys, and/or tone maps.

Figure 6B:
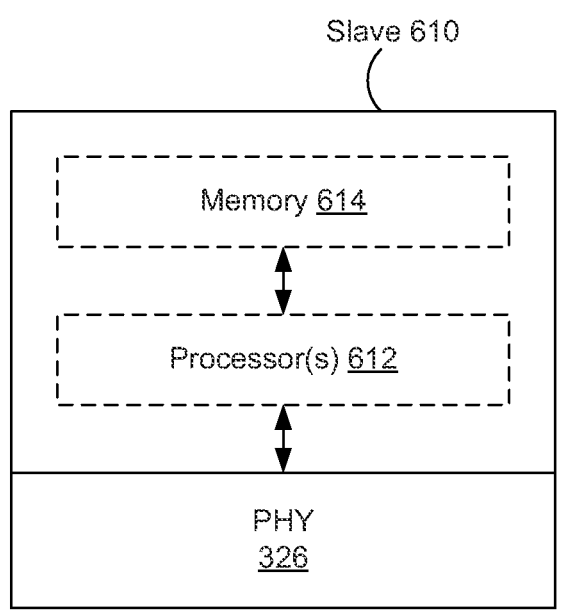
FIG. 6B is a block diagram of a slave device in accordance with some embodiments.

In some embodiments, the TDMA MAC 318 (FIG. 3) in a slave device 316 (FIG. 3) is implemented in software. FIG. 6B is a block diagram of a slave device 610 that is an example of such a slave device 316 (FIG. 3) in accordance with some embodiments. In the slave device 610, the PHY 326 is coupled to one or more processor cores 612, which are coupled to memory 614. In some embodiments, the memory 614 includes a non-transitory computer-readable medium (e.g., one or more nonvolatile memory elements, such as EPROM, EEPROM, Flash memory, a hard disk drive, and so on) that stores instructions for execution by the one or more processor cores 612. The instructions include instructions that, when executed by the processor core(s) 612, cause the slave device 610 to perform all or a portion of the method 500 (FIG. 5A). The memory 604 may also store the identifier (e.g., TEI) assigned to the slave device 610, the network security key provided to the slave device 610, and/or tone maps.

While the memories 604 (FIG. 6A) and 614 (FIG. 6B) are shown as being separate from respective processor core(s) 602 and 612, all or a portion of the memories 604 and/or 614 may be embedded in the respective processor cores 602 and 612. In some embodiments, the processor core(s) 602 and/or 612 are implemented in the same integrated circuit as respective PHYs 314 and 326. For example, the PHYs 314 and/or 326 may be integrated with the respective processor cores(s) 602 and 612 in single chips, which may or may not also include the respective memories 604 and 614.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of registering a network device, comprising:
in a respective slave device of a plurality of slave devices coupled to a master device:
receiving beacon messages from the master device, the beacon messages specifying upstream time slots, downstream time slots, and contention-based time slots;
during a contention-based time slot, transmitting an association request to the master device;
during a first downstream time slot, receiving an association response from the master device;
in response to receiving the association response, transmitting an authentication request to the master device during an upstream time slot; and
receiving an authentication response from the master device during a second downstream time slot.

2. The method of claim 1, wherein the association response specifies an identifier for the respective slave device.

3. The method of claim 2, wherein receiving the beacon messages comprises:
receiving a first beacon message specifying the contention-based time slot; and
receiving a second beacon message assigning the upstream time slot to the respective slave device, wherein the second beacon message associates the upstream time slot with the identifier for the respective slave device.

4. The method of claim 1, wherein the authentication response provides a security key to the respective slave device.

5. The method of claim 1, further comprising receiving an acknowledgment of the association request from the master device during the contention-based time slot.

6. The method of claim 1, further comprising:
not receiving an acknowledgment of the association request from the master device during a specified period of time after transmitting the association request; and
in response to not receiving the acknowledgment during the specified period of time, retransmitting the association request during the contention-based time slot.

7. The method of claim 1, wherein the association request, the association response, the authentication request, and the authentication response each comprise a management message entry (MME).

8. The method of claim 1, wherein:
the beacon messages are received during respective beacon periods; and
transmitting the association request, receiving the association response, transmitting the authentication request, and receiving the authentication response are performed during successive beacon periods.

9. The method of claim 1, further comprising:
in response to receiving the authentication response, transmitting a message to the master device requesting bandwidth for sounding; and
performing the sounding using the requested bandwidth to generate a tone map for communication between the respective slave device and the master device.

10. The method of claim 9, wherein:
the upstream time slot during which the authentication request is transmitted is a first upstream time slot; and
performing the sounding comprises transmitting known data to the master device during a second upstream time slot.

11. The method of claim 10, wherein performing the sounding further comprises receiving known data from the master device during a third downstream time slot.

12. The method of claim 9, wherein:
the beacon messages are received during respective beacon periods; and
the sounding is performed in a next available beacon period after transmitting the message to the master device requesting bandwidth for sounding.

13. The method of claim 1, wherein transmitting the association request to the master device during the contention-based time slot is performed in accordance with a carrier-sense multiple access (CSMA) protocol.

14. A slave device, comprising:
a physical-layer device (PHY) to transmit signals to and receive signals from a master device, the received signals including beacon messages specifying upstream time slots, downstream time slots, and contention-based time slots;
one or more processors; and
memory storing instructions that, when executed by the one or more processors, cause the slave device to:
transmit an association request to the master device during a contention-based time slot;
process an association response received from the master device during a first downstream time slot;
transmit an authentication request to the master device during an upstream time slot, in response to receiving the association response; and
process an authentication response received from the master device during a second downstream time slot.

15. The slave device of claim 14, wherein the memory further stores instructions that, when executed by the one or more processors, cause the slave device to:
transmit a message to the master device requesting bandwidth for sounding; and
perform the sounding using the requested bandwidth to generate a tone map for communication between the respective slave device and the master device.

16. A method of registering a network device, comprising:
in a master device coupled to a plurality of slave devices:
transmitting beacon messages that specify upstream time slots, downstream time slots, and contention-based time slots;
during a contention-based time slot, receiving an association request from a respective slave device;
in response to the association request, transmitting an association response to the respective slave device during a first downstream time slot;
receiving an authentication request from the respective slave device during an upstream time slot; and
in response to the authentication request, transmitting an authentication response to the respective slave device during a second downstream time slot.

17. The method of claim 16, further comprising:
after transmitting the authentication response, and before arrival of data for transmission to the respective slave device, allocating bandwidth for performing sounding with the respective slave device; and
performing the sounding using the allocated bandwidth to generate a tone map for communication between the respective slave device and the master device.

18. A master device, comprising:
a physical-layer device (PHY) to transmit signals to and receive signals from a plurality of slave devices;
one or more processors; and
memory storing instructions that, when executed by the one or more processors, cause the master device to:
transmit beacon messages that specify upstream time slots, downstream time slots, and contention-based time slots;
process an association request received from a respective slave device during a contention-based time slot;
in response to the association request, transmit an association response to the respective slave device during a first downstream time slot;
process an authentication request received from the respective slave device during an upstream time slot; and
in response to the authentication request, transmit an authentication response to the respective slave device during a second downstream time slot.

19. The master device of claim 18, wherein the memory further stores instructions that, when executed by the one or more processors, cause the master device to:
after transmitting the authentication response, and before arrival of data for transmission to the respective slave device, allocate bandwidth for performing sounding with the respective slave device; and
performing the sounding using the allocated bandwidth to generate a tone map for communication between the respective slave device and the master device.

20. A system, comprising a master device coupled to a plurality of slave devices, wherein:
the master device is configured to:
transmit beacon messages that specify upstream time slots, downstream time slots, and contention-based time slots;

in response to an association request from a respective slave device, transmit an association response to the respective slave device during a first downstream time slot; and in response to an authentication request from the respective slave device, transmit an authentication response to the respective slave device during a second downstream time slot; and the respective slave device is configured to:

transmit the association request during a contention-based time slot; and transmit the authentication request during an upstream time slot.

21. The system of claim 20, wherein:

the respective slave device is further configured to transmit a message to the master device requesting bandwidth for sounding, in response to receiving the authentication response; and the master device is further configured to allocate bandwidth for the sounding, in response to the message requesting bandwidth for the sounding.

\* \* \* \* \*